United States Patent [19]

Paluszek

[11] Patent Number: 5,107,434
[45] Date of Patent: Apr. 21, 1992

[54] THREE-AXIS SPACECRAFT ATTITUDE CONTROL USING POLAR STAR SENSOR

[75] Inventor: Michael A. Paluszek, Lawrenceville Township, Mercer County, N.J.

[73] Assignee: General Electric Company, King of Prussia, Pa.

[21] Appl. No.: 511,169

[22] Filed: Apr. 19, 1990

[51] Int. Cl.$^5$ .................. G06F 15/50; B64G 1/24
[52] U.S. Cl. .................... 364/455; 364/459; 244/164
[58] Field of Search .................. 364/455, 459; 250/206.2; 356/141-143; 244/164-166, 169-171

[56] References Cited

U.S. PATENT DOCUMENTS

| H712 | 11/1989 | Hartman | 364/456 |
|---|---|---|---|
| 4,114,841 | 9/1978 | Muhlfelder et al. | 244/166 |
| 4,617,634 | 10/1986 | Izumida et al. | 364/455 |
| 4,674,715 | 6/1987 | Frisch | 244/171 |
| 4,680,718 | 7/1987 | Sasaki et al. | 364/455 |
| 4,746,976 | 5/1988 | Kamel et al. | 358/103 |
| 4,827,422 | 5/1989 | Savoca | 364/459 |
| 4,837,699 | 6/1989 | Smay et al. | 364/434 |
| 4,916,622 | 4/1990 | Raman et al. | 364/459 |
| 5,012,081 | 4/1991 | Jungwirth et al. | 250/203.6 |

OTHER PUBLICATIONS

"A Fast Attitude Recovery System for Communications Satellites: Experience of Eutelsat 5", by VanHoltz et al., published in connection with the 12th Annual AAS Guidance and Control Conference, Feb. 4–8, 1989 in Keystone, Colo.

Primary Examiner—Thomas G. Black
Attorney, Agent, or Firm—W. H. Meise; C. A. Berard; S. A. Young

[57] ABSTRACT

A three-axis attitude control system for a spacecraft in an equatorial orbit includes at least a horizon sensor for producing pitch-representative signals. A star sensor has a boresight parallel to the spacecraft pitch axis, and produces signals representative of the two-axis location of a selected pole star relative to the boresight. The star sensor signals are processed in conjunction with the pitch-representative signals and with orbit-location information, to produce roll and yaw information. The pitch, roll and yaw information controls spacecraft torquing. In a particular embodiment of the invention, the horizon sensor arrangement also produces roll signals, which are processed with the roll signals from the star sensor.

9 Claims, 5 Drawing Sheets

| SAO NO. | INSTR. MAG | DECLINATION | | | RIGHT ASCENSION | | | UNIT POSITION VECTOR | | | PROPER MOTION |
|---|---|---|---|---|---|---|---|---|---|---|---|
| | | DD | MM | SS.SSS | HH | MM | SS.SSSS | X | Y | Z | ARCSEC/YR |
| 308 | 1.68 | 89 | 1 | 43.739 | 1 | 48 | 48.8494 | 0.01507 | 0.00775 | 0.99986 | 0.0462 |
| 1168 | 3.82 | 87 | 7 | 34.507 | 7 | 17 | 50.6023 | -0.01670 | 0.04727 | 0.99874 | 0.0495 |
| 3020 | 5.22 | 89 | 3 | 3.501 | 18 | 21 | 21.7815 | -0.00302 | -0.01649 | 0.99986 | 0.0267 |
| 3916 | 5.39 | 87 | 1 | 54.837 | 23 | 27 | 34.2458 | 0.05126 | -0.00730 | 0.99866 | 0.0818 |
| 258970 | 4.87 | -87 | -45 | -27.436 | 23 | 21 | 22.1813 | 0.03857 | -0.00656 | -0.99923 | 0.0220 |
| 258857 | 5.33 | -89 | -8 | -18.480 | 20 | 15 | 3.0429 | 0.00836 | -0.01250 | -0.99989 | 0.0264 |
| 258410 | 5.67 | -88 | -20 | -11.628 | 5 | 23 | 4.2690 | 0.00466 | 0.02865 | -0.99958 | 0.0115 |
| 258799 | 4.62 | -87 | -39 | -9.965 | 18 | 25 | 46.6377 | 0.00460 | -0.04070 | -0.99916 | 0.1395 |
| 258660 | 5.12 | -89 | -31 | -16.511 | 13 | 7 | 57.3761 | -0.00799 | -0.00244 | -0.99997 | 0.0152 |

THREE-AXIS SPACECRAFT ATTITUDE CONTROL USING POLAR STAR SENSOR

BACKGROUND OF THE INVENTION

This invention relates to spacecraft attitude control, and more particularly to three-axis spacecraft attitude control using a polar star sensor in conjunction with an Earth sensor.

Artificial satellites or spacecraft are in widespread use for various purposes. For some purposes, as for example for communication purposes, a satellite may be required to direct an instrument toward particular locations on the surface of a heavenly body about which it orbits, such as Earth.

For communications between spaced-apart locations on the surface of the Earth, or for broadcasting purposes, the geosynchronous satellite provides certain advantages. The geosynchronous satellite occupies an equatorial orbit, and may be either spin-stabilized or three-axis stabilized. In order to keep an antenna or antennas pointed at particular locations, the spin-stabilized satellite must include a de-spun platform on which the Earth-pointing antennas or sensors are mounted. Spin stabilized spacecraft require large momentum biases to maintain tight pointing.

A three-axis stabilized spacecraft uses a system of torquers for applying torques to the spacecraft in relation to roll, pitch and yaw axes for maintaining its attitude under the control of one or more attitude sensors. Torquing to maintain orientation may be accomplished by magnetic torquers, by chemical thrusters, by momentum or reaction wheels or any combination of the three.

The attitude of the spacecraft may be determined by any of a number of systems. One attitude sensing system, used on commercial communications satellites, requires an Earth horizon sensor together with a sun sensor for attitude control. The Earth sensors provide pitch and roll information, while the sun sensor provides information at certain times of day which allows for updating of the yaw information. Yaw must be estimated during those intervals in which a sun sensor measurement is not available. These sensors, together with the quarter-orbit interchange of roll and yaw axes, provide sufficient information for stabilization of a spacecraft under ordinary conditions. The horizon sensors, however, may not provide precise information because of atmospheric affects in obscuring the horizon, and the yaw update information may not provide sufficient control for precise pointing. For less precise pointing requirements on momentum bias spacecraft only the horizon sensors are needed and the gyroscopic coupling of the momentum wheel may be used to maintain the yaw attitude.

In another attitude control system, gyroscopes may be mounted within the spacecraft to provide angular rate information. Since gyroscopes are subject to errors due at least to bearing friction, they must be periodically updated. The updates may be provided by Earth horizon sensors and sun sensors, but these are subject to errors as described above. The gyros may be updated by a system of star sensors. Such a system of star sensors observes portions of the sky and matches the observed scene with a memorized star map. Such an arrangement may provide precise control, but is extremely expensive because the star sensor must respond to stars over a substantial range of magnitudes in order to make a meaningful comparison with the memorized chart. The requirement for observation of stars over a substantial range of magnitudes in turn requires cooling of the image sensing devices in order to detect the fainter stars, and also requires linearity of response or at least a response which is well characterized so that the relative magnitudes of the star may be determined for the comparison. The cost of such a star sensing system is prohibitive for a commercial communications satellite. Gyroscopes suitable for long life such as might be required for a 10-year commercial communications satellite application are extremely expensive. The cost of such gyros is also prohibitive for commercial communications satellites.

SUMMARY OF THE INVENTION

A three-axis attitude control system for a spacecraft in an equatorial orbit includes a polar star sensor mounted on the spacecraft with a boresight parallel to the spacecraft pitch axis for producing star signals representative of the two-axis location of a selected polar star relative to the pitch axis. The spacecraft also includes an Earth sensor for generating signals which represent at least the pitch of the spacecraft about the pitch axis. The spacecraft also includes a memory loaded with information representing ephemeris and the orbital location. The memorized information may be transmitted to the spacecraft during operation, or it may be preprogrammed, or both. A processor is coupled to the polar star sensor, to the Earth sensor and to the source of orbit or ephemeris information for processing the information for generating at least signals representative of yaw. The Earth sensor, or the star sensor together with the processor, or both, produce signals representative of roll. Torquers respond to the signals representative of pitch, roll and yaw for torquing the spacecraft to maintain the desired attitude. In a particular embodiment of the invention, both the Earth sensor and the star sensor/processor generate information relative to roll, and a combiner combines both roll signals from the to produce a composite roll signal.

DESCRIPTION OF THE INVENTION

Figure 1:
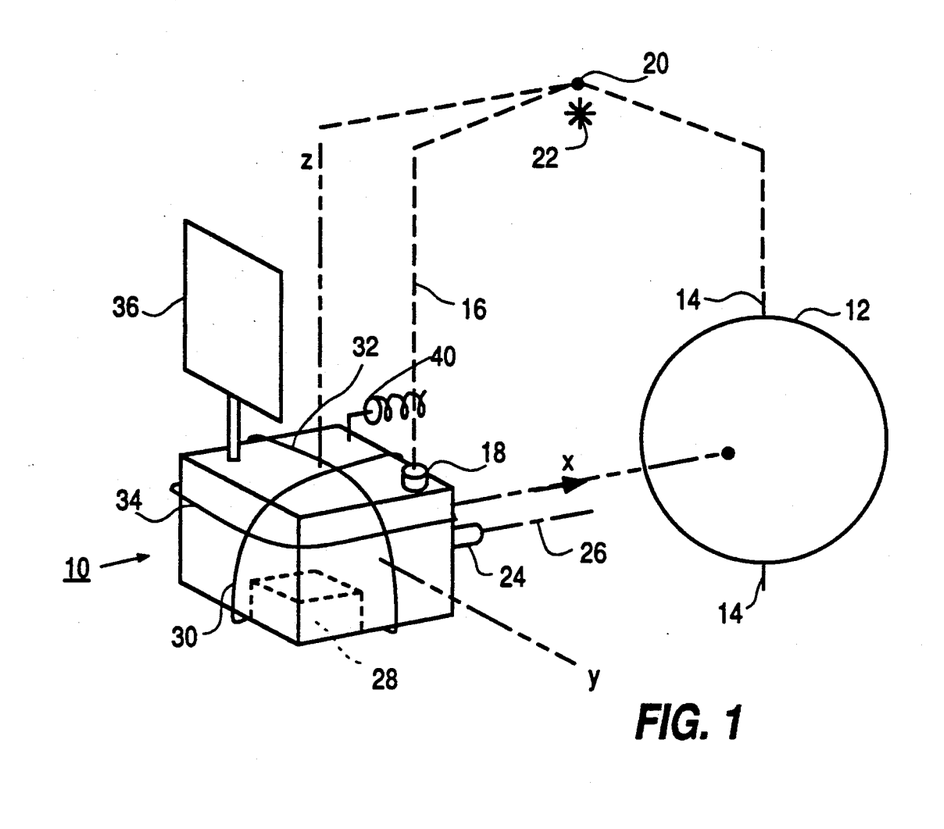
FIG. 1 is a simplified perspective or isometric view of a spacecraft in an equatorial orbit around the Earth, illustrating a polar star sensor and an Earth sensor.

FIG. 1 is a simplified perspective or isometric view of a satellite 10 in an equatorial orbit about the Earth 12. Satellite 10 is illustrated in its desired attitude, with the pitch or z axis perpendicular to the orbit plane, and with motion in the direction of the roll or y axis. The yaw or x axis is directed toward the center of the Earth.

As illustrated in FIG. 1, the Earth's rotational axis 14 is approximately parallel to the boresight, illustrated as a dashed line 16, of a star sensor 18 mounted on spacecraft 10. Both axis 14 and boresight 16 are pointed at a distant location in space which is designated 20, which is near but not precisely at a selected pole star illustrated as 22. As described below, the pole star may be a north or south pole star, but is preferably selected to be $\alpha$ Ursa Minoris (Polaris), SAO number 308. An Earth sensor assembly (ESA) illustrated as 24 is mounted on the spacecraft with its boresight, illustrated as a dot-dash line 26, directed toward the Earth. A control circuit or control arrangement illustrated as a block 28 is associated with the spacecraft and is coupled (by means not illustrated in FIG. 1) to star sensor 18 and to Earth sensor assembly 24 for determining the spacecraft orientation. Mutually orthogonal torquing coils illustrated as 30, 32 and 34 are coupled to control block 28 by means (not illustrated) for being energized for torquing the spacecraft to correct the attitude. An antenna 40 is mounted on the spacecraft and directed toward the Earth for communication therewith. Antenna 40 may be coupled to control block 28 for receiving control instructions from a ground station, and for sending to the ground station information relating to the condition of the spacecraft. A rotatable solar panel 36 is mounted on the spacecraft in such a position that its rotation does not block boresight 16 of star sensor 18.

Figure 2A:
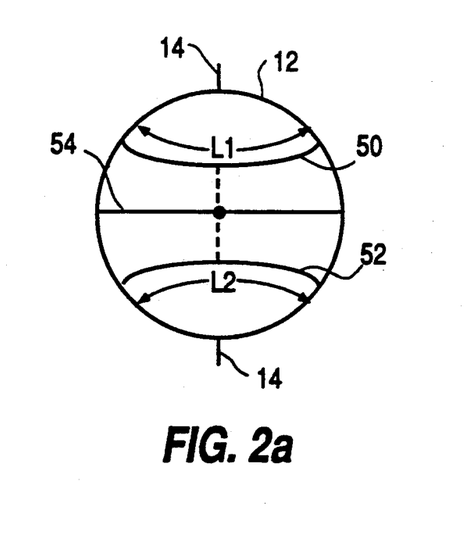
FIGS. 2a and 2b, referred to jointly as FIG. 2, illustrate a scanning type of operation of the Earth sensor of FIG. 1, which provides both pitch and roll information.
Figure 2B:
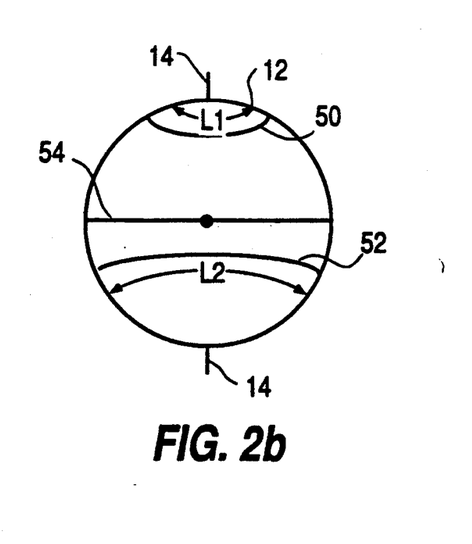

Earth sensor assembly 24 of FIG. 1 is of the scanning type, which simultaneously or sequentially scans a pair of paths across the Earth. Signals are generated at each crossing of the Earth's horizon. The lengths or durations of each scan can be determined by the time duration between horizon crossings. FIG. 2a illustrates the Earth 12, and first and second scan paths 50 and 52. As illustrated, scan paths 50 and 52 are centered above and below an equator line 54. Consequently, scan paths 50 and 52 are traversed in the same time duration, L1 and L2, respectively. FIG. 2b illustrates a condition in which the spacecraft has rolled about the y axis of FIG. 1, so that scans 50 and 52 are not equidistant from equator line 54. As illustrated, scan line 50 is completed in a time L1, which is much shorter than the time L2 required for completion of scan 52. The difference between periods L1 and L2 is indicative of roll.

Earth sensor assembly 24 can also provide an indication of pitch. As mentioned, when the spacecraft is properly oriented about the roll axis, as illustrated in FIG. 2a, the duration L1 for completion of scan 50 equals the duration L2 required for completion of scan 52. The scan wheel (not illustrated) of the Earth sensor assembly may be calibrated so that a particular position of the scan wheel corresponds to boresight 26 of FIG. 1. A deviation of the boresight condition of the scan wheel of Earth sensor assembly 24 at the instant when scans 50 and 52 of FIG. 2a are at their midpoint indicates a pitch error. Thus, Earth sensor assembly 24 may be used to provide an indication of both roll and pitch errors. Such sensors are described at pages 166–180, in the text "Spacecraft Attitude Determination and Control", edited by James R. Wertz, published by D. Reidel Publishing Co., first edition 1985.

Figure 3:
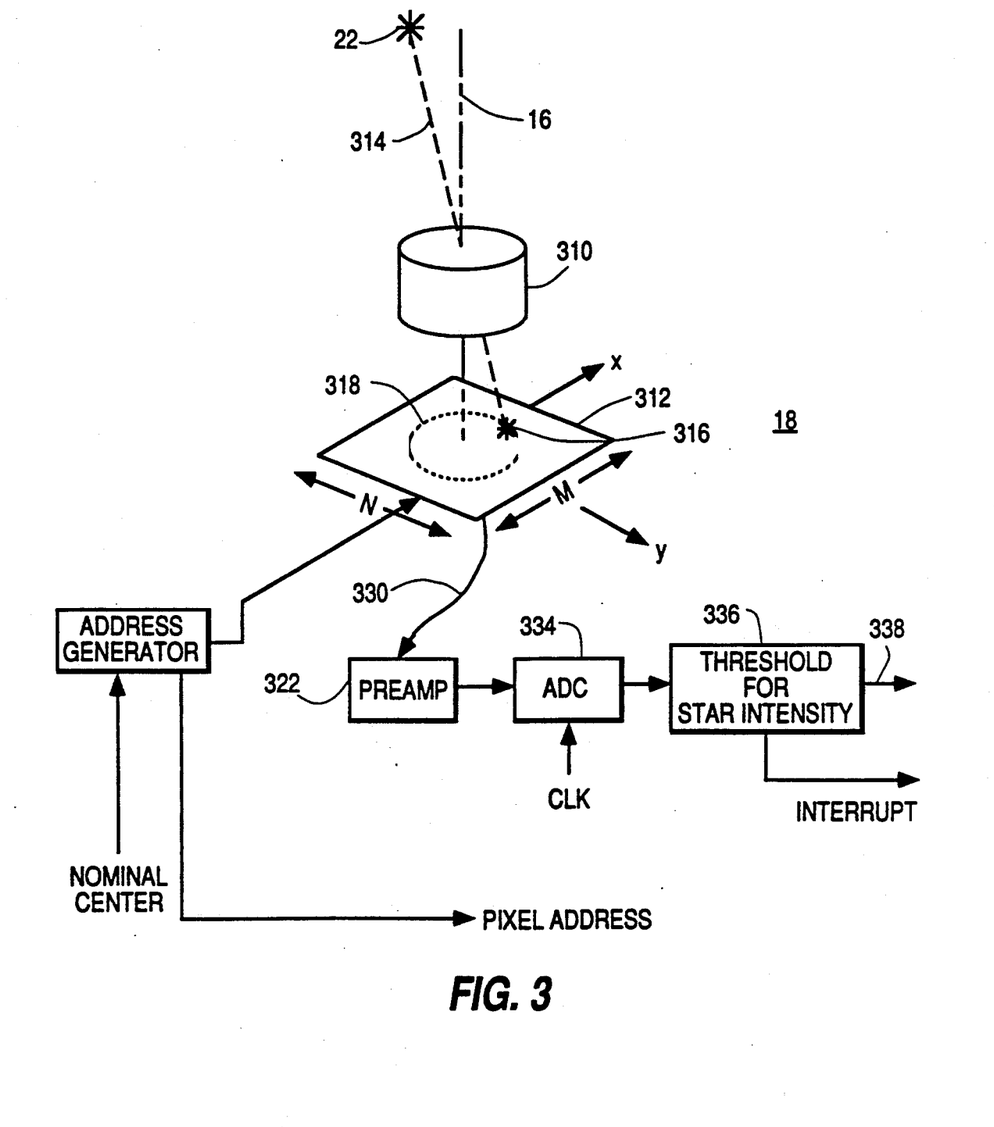
FIG. 3 is a simplified schematic diagram illustrating the operation of the polar star sensor of FIG. 1.

FIG. 3 is a simplified schematic diagram of star sensor 18 of FIG. 1. In FIG. 3, star sensor 18 includes an optical assembly 310 and a sensor array 312 lying at its focal plane, both centered on boresight 16. As illustrated in FIG. 3, polar star 22 is not centered on boresight 16. Consequently, a line-of-sight 314 extending from polar star 22 to sensor array 312 causes an image of the star, illustrated as 316, to be projected onto the sensor array. During the orbit of the satellite around the Earth, the apparent position of star 22 relative to boresight 16 changes, so that image 316 traces a circular path, illustrated by dashed line 318, about boresight 16.

As described below, knowledge of the orbital position of the spacecraft at any moment, and of ephemeris information, allows the expected position of image 316 on sensor array 312 of FIG. 3 to be calculated. Any deviation of the image 316 of the star from the calculated position is indicative of errors in the x and y directions illustrated in FIG. 3, which errors are representative of roll and yaw. In particular, yaw errors will cause the actual position of star image 316 to deviate in the y direction from the calculated position of the image, while roll errors cause the image to deviate in the x direction. A combination of roll and yaw error will ordinarily be encountered, so a combination of x and y displacement is to be expected.

The field-of-view (FOV) of star sensor 18 may be narrow, since it need only track stars with declination greater than about 88°. The field-of-view should be at least 16.5°×16.5° to track Polaris for use in spacecraft with inclinations up to 5°. The star sensor should provide adequate accuracy and should include the simplest arrangement, including the least number of pixels in the array, for achieving the desired accuracy. Its sensitivity should be sufficient to sense Polaris, but not other polar stars. These ends are achieved by a sensor of the CCD (charge-coupled device) or CID (charge-injection device) type, without cooling. Arrays of such sensors are well known. As illustrated in FIG. 3, array 312 is a rectangular NXM array.

A convenient array size is N=512, M=512, with a FOV of 6.5°×6.5 for a geosynchronous orbit. A preamplifier illustrated as a block 332 is illustrated in FIG. 3 as being coupled to the sensor array for receiving clocked analog signals therefrom, as known. An analog-to-digital converter (ADC) 334 converts the analog signals to corresponding digital values, which may be produced either in parallel or serial form. The array may be expected to be sufficiently sensitive so that discernible signals will be generated for stars other than Polaris. In order to limit the response, a digital threshold detector 336 limits the output signals on output data path 338 to those exceeding a preset magnitude. The preset magnitude is established at around instrument magnitude 2.5, so that Polaris far exceeds the threshold, and other polar stars are well below. As a result, only pixels responding at a level above magnitude 2.5 produce an output. This reduces susceptibility to stray light, decreases sensitivity to radiation damage, and renders false star sightings unlikely. Threshold block 336 also includes an interrupt output on a data path 339 for indicating to the flight computer (not illustrated) that a measurement is ready.

The sensor's field-of-view is determined by the allowable orbit inclination, star declination and attitude error. Polaris has a declination greater than 89°. Therefore, a 16.5°×16.5° field-of-view would be sufficient to track Polaris for spacecraft in orbits with inclinations up to 5°(5° for inclination +1 for Polaris +2.25 for attitude errors). A 7° inclination would require a 20.5×20.5°FOV.

Ideally, the sensor should be addressable for scanning over less than the full N X M array (subscanning), as for example by subscanning a P-X-Q-pixel region about a specified pixel representing the nominal center of the subscan region. In the case of 3×3 or 5×5 pixel subscans, the nominal center corresponds to the address of an actual pixel. In the case of 4×4 or other even numbers, the center is a virtual point requiring somewhat more complex addressing. On the other hand, certain types of processing may be accomplished more readily with even numbers than with odd, and a 16×16 subscan may be more desirable than a 17×17 subscan even though the addressing may be more complex. The nominal center of the subscan is established by the flight computer, based upon the orbit position, the desired attitude, the system geometry, and ephemeris information, to place the Polaris image near the center of the subscan.

If a full array scan is used without subscanning, the location of Polaris in the focal plane may be determined by simply seeking the pixel with the largest-magnitude output, and defining that pixel as the one upon which Polaris is imaged. For this type of operation, optics 310 of FIG. 3 are designed for focussing onto an area equivalent to one pixel of the array. The resolution of this technique is 1 pixel, and for a 512×512 array and 5° inclination situation the resolution R is given by $$R = 16.5°/512 = 0.03° \quad (1)$$

which is generally sufficient for geosynchronous communications satellites.

If greater pointing accuracy is desired, the optics are designed to defocus the Polaris image so that it covers several pixels, and the array is subscanned over the illuminated portion. A centroid calculation is then performed. Calculation of a centroid of an intensity along a scan line is well known and is described, for example, in allowed U.S. Pat. application Ser. No. 07/372,580 filed Jun. 28, 1989 in the name of Chmielewski, Jr. et al. The resolution R in the defocussed, centroid-calculated method is $$R = Fe_i/N \quad (2)$$

where $e_i$ is approximately 0.01 and FOV is the width in degrees of the field-of-view. For a 16.5°×16.5° FOV, a resolution of 0.001 can be achieved with a 165×165 pixel array. This scheme provides greater resolution with a smaller array than the above-described noncentroid method, but requires more complex signal processing.

For still greater resolution the centroid calculation may be made over the entire array. For a 512×512 array, the resolution for the 5° inclination situation may be as great as 0.0003°.

Figure 5:
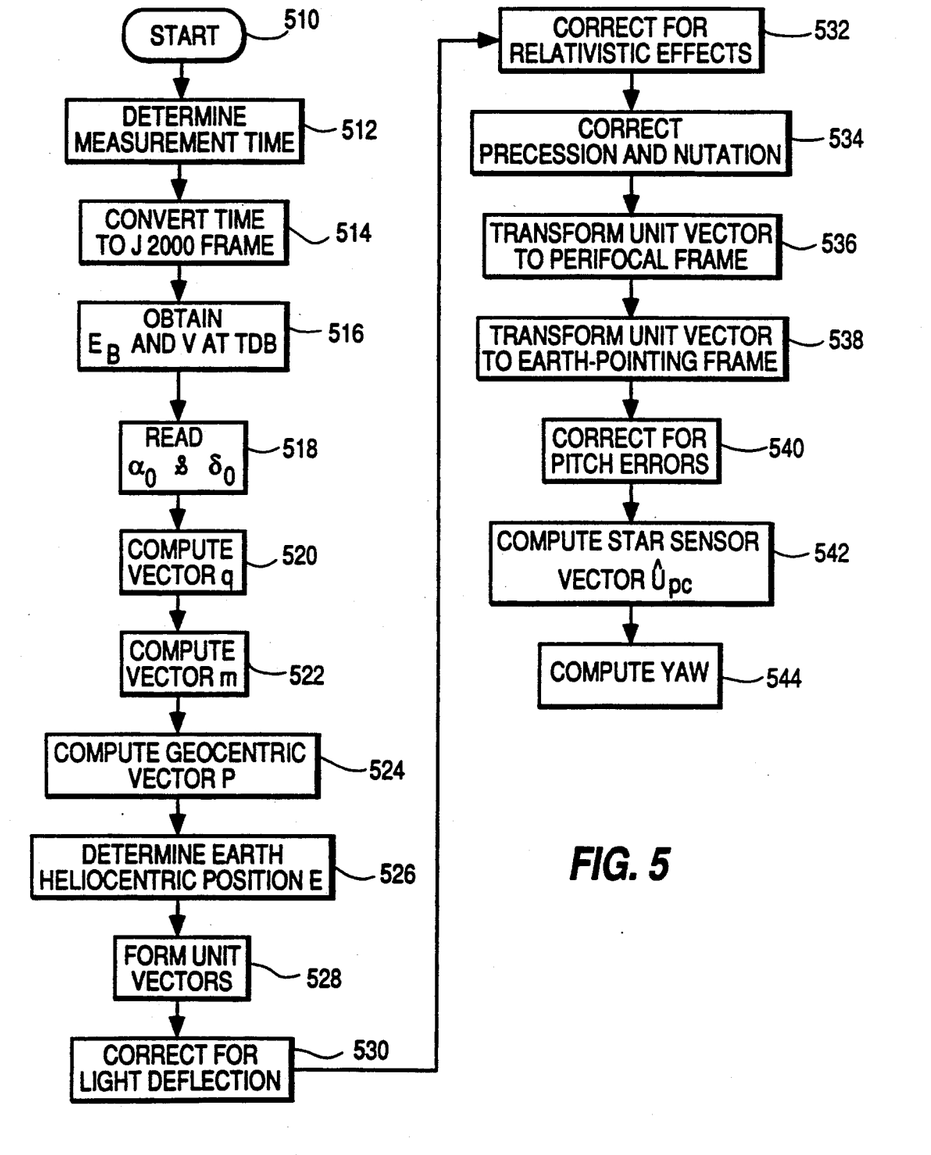
FIG. 5 is a simplified flow chart illustrating the processing of information from the polar star sensor and the Earth sensor for determining roll, pitch and yaw.

FIG. 5 is a simplified flow chart which describes the signal processing performed in block 28 of FIG. 1 for determining the spacecraft yaw from the measurements made by the apparatus described in conjunction with FIG. 2. In FIG. 5, block 510 represents the beginning of a yaw determination sequence, and block 512 represents the reading of the current time (or, if the computation is delayed, the time at which the star measurement was made). Block 514 represents the conversion of current time to the noon, Jan. 1, 2000 (J2000) frame. The converted time is barycentric dynamical time (TDB), which is used as a time scale of ephemerides referred to the barycentre of the solar system. Block 516 represents reading from tabulated data stored in a memory (i.e., Astronomical Almanac) of the Earth's barycentric position in astronomical units (au) and velocity at coordinate time t=TDB. Block 518 represents the reading from memory of the right ascension ($\alpha_o$) and declination ($\delta_o$) of the polar star at J2000. Block 520 represents computation of the barycentric direction (q) of the polar star at epoch J2000

$$q = \begin{bmatrix} \cos \alpha_o \cos \delta_o \\ \sin \alpha_o \cos \delta_o \\ \sin \delta_o \end{bmatrix} \quad (3)$$

where $\alpha_o$ and $\delta_o$ are the right ascension and declination in the J2000.0 frame for the equator and equinox for epoch J2000.0.

Block 522 represents calculation of space motion vector m $$m = \begin{bmatrix} -\mu_\alpha \cos\delta_o \sin\alpha_o - \mu_\delta \sin\delta_o \cos\alpha_o - v\pi\cos\delta_o\cos\alpha_o \\ \mu_\alpha \cos\delta_o \cos\alpha_o - \mu_\delta \sin\delta_o \sin\alpha_o + v\pi\cos\delta_o\sin\alpha_o \\ \mu_\delta \cos\delta_o + v\pi\sin\delta_o \end{bmatrix} \quad (4)$$

where $\pi$ is the parallax, ($\lambda_\alpha$, $\lambda_{67}$) are the proper motion velocities, and v is the radial velocity measured positively away from the Earth.

Block 524 represents calculation of the geocentric vector P of the polar star at the moment of measurement $$P = q + Tm - \pi E_B \quad (5)$$

where T, the interval in Julian Centuries from J2000.0, is given by $$T = (JD - 245\ 1545\ 0)/36525 \quad (6)$$

where JD is the Julian date in days, and 245 1545 is the Julian date for the year 2000, and 36525 is the number of days in a Julian century.

JD can be calculated in a straightforward fashion from TDB, as described, for example, in the 1989 Astronomical Almanac printed by the U.S. Government Printing Office.

Block 526 represents determination of the heliocentric position E of Earth $$E = E_8 - S_B \quad (7)$$

'where $S_B$ is the barycentric position of the sun at time t=TDB.

Block 528 represents formation of unit vectors $$p = P/|P| \quad (8)$$

$$\text{and } e = E/|E| \quad (9)$$

Correction for light deflection is performed in block to form corrected vector $P_1$ $$p_1 = p + \frac{\left(\frac{2\mu}{c^2 E}\right)(e - (p \cdot e)p)}{1 + p \cdot e} \quad (10)$$

were $\lambda/c^2$ is $9.87 \times 10^{-9}$ au and $E = |E|$.

Relativistic effects are compensated for in block 532.

$$p_2 = \frac{\beta^{-1} p_1 + \left(\frac{1 + p_1 \cdot V}{1 + \beta^{-1}}\right) V}{1 + p_1 \cdot V} \tag{11}$$

where v is the Earth's barycentric velocity vector ($dE_B/dt$) at time t divided by the speed of light in a vacuum ($3 \times 10^8$ m/sec), and $$\beta = \frac{1}{\sqrt{1 - V^2}} \tag{12}$$

Precession and nutation are corrected for in block 534 to find the apparent location of the polar star at the focal plane at time t=TBD $$u_{ECI} = M \, p_2 \tag{13}$$

where M is the $3 \times 3$ transformation matrix that transforms from the J2000.0 frame to the equator and equinox frame of the time of measurement. This gives the unit vector in the Earth-Centered-Inertial (ECI) frame of date.

The unit vector $\mu$ is transformed into the perifocal frame unit vector $\mu_{PF}$ in block 536

$$u_{PF} = M_{ECI\text{-}TO\text{-}PF} u_{ECI} \tag{14}$$

In block 538, the unit vector u is transformed into the nominal spacecraft (Earth-pointing) frame $$u_{EP} = M_{PF\text{-}TO\text{-}EP} u_{PF} \tag{15}$$

If Polaris were at the pole and the attitude errors were zero, Polaris would appear along the boresight of the sensor. Since Polaris is not at the pole and attitude errors may occur, the largest component $u_{ep}$ of is along the boresight, and it has only small components in the focal plane. As the spacecraft moves in its orbit the star traces a circular path in the focal plane, as illustrated in FIG. 3.

Pitch errors of the spacecraft will cause apparent errors in the position of the image of Polaris at the focal plane, as described above. These are corrected in block 540 of FIG. 5 by using the Earth sensor assembly (ESA) pitch signals $$u_{PC} = M_{EP\text{-}TO\text{-}PC} u_{EP} \tag{16}$$

Figure 6:
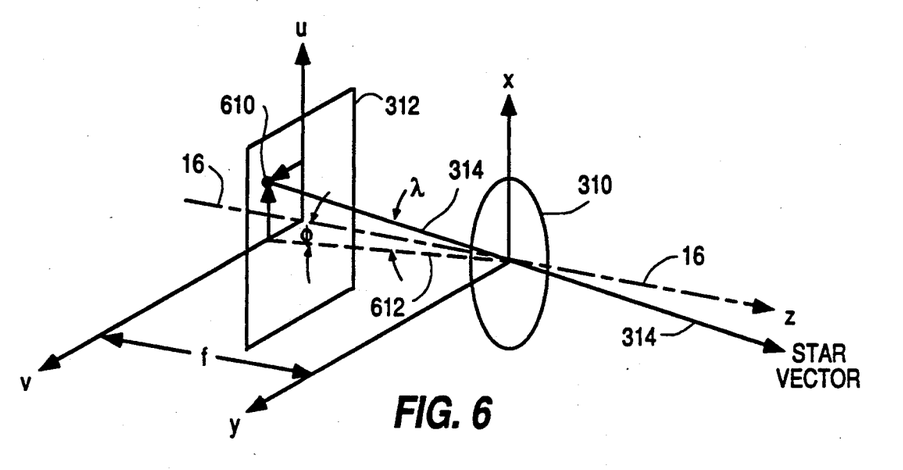
FIG. 6 is a simplified schematic diagram of the star sensor of FIG. 3 illustrating coordinate axes used in calculations in FIG. 5.

FIG. 6 illustrates certain geometrical relationships associated with the star sensor of FIG. 3. Elements of FIG. 6 corresponding to those of FIG. 3 are designated by the same reference numerals. In FIG. 6, auxiliary coordinates u, v and $\lambda$, $\phi$ are associated with array 312 of sensor elements. Auxiliary coordinate u is parallel with coordinate x, and v is parallel to coordinate y, but they are mutually displaced along boresight 16 by a distance f, the focal length of lens 310. Star vector 314 intercepts the focal plane (the plane of the array) at a point 610. Angle $\phi$ is the angle between boresight 16 and the projection 612 of star vector 314 onto the y-z plane. Angle $\lambda$ is the angle between star vector 314 and the y-z plane.

The star sensor vector is calculated in block 542 of FIG. 5, using the geometry of FIG. 6:

$$\hat{u}_{PC} = \begin{bmatrix} -\sin \phi \cos \lambda \\ \cos \phi \cos \lambda \\ -\sin s \lambda \end{bmatrix} \tag{17}$$

where $$\tan \phi = \frac{u}{f} \tag{18}$$

$$\tan \lambda = \frac{v}{f} \cos \phi \tag{19}$$

and u and v are the coordinates of the centroid of the star image in the focal plane. The measured unit vector and the calculated unit vector are related by the attitude matrix $$u_{PC} = A(\text{roll,yaw}) \hat{u}_{PC} \tag{20}$$

Equation (19) may be solved for attitude roll and yaw in several manners any of which may be used in block 544 of FIG. 5. A convenient method is to use the measured roll attitude from the Earth sensor assembly described in conjunction with FIGS. 1 and 2 together with the nine separate equations inherent in equation (19) to solve for yaw. For example, for low accuracy applications $$\begin{bmatrix} \hat{u}_x \\ \hat{u}_y \\ \hat{u}_z \end{bmatrix} = \begin{bmatrix} 1 & 0 & \theta_y \\ 0 & 1 & -\theta_z \\ \theta_y & \theta_z & 1 \end{bmatrix} \begin{bmatrix} u_x \\ u_y \\ u_z \end{bmatrix} \tag{21}$$

The solutions for roll ($\theta_y$) and yaw ($\theta_x$) are $$\theta_y = \frac{\hat{u}_x - u_x}{u_z} \tag{22}$$

$$\theta_x = -\frac{\hat{u}_y - u_y}{u_z} \tag{23}$$

Figure 4:
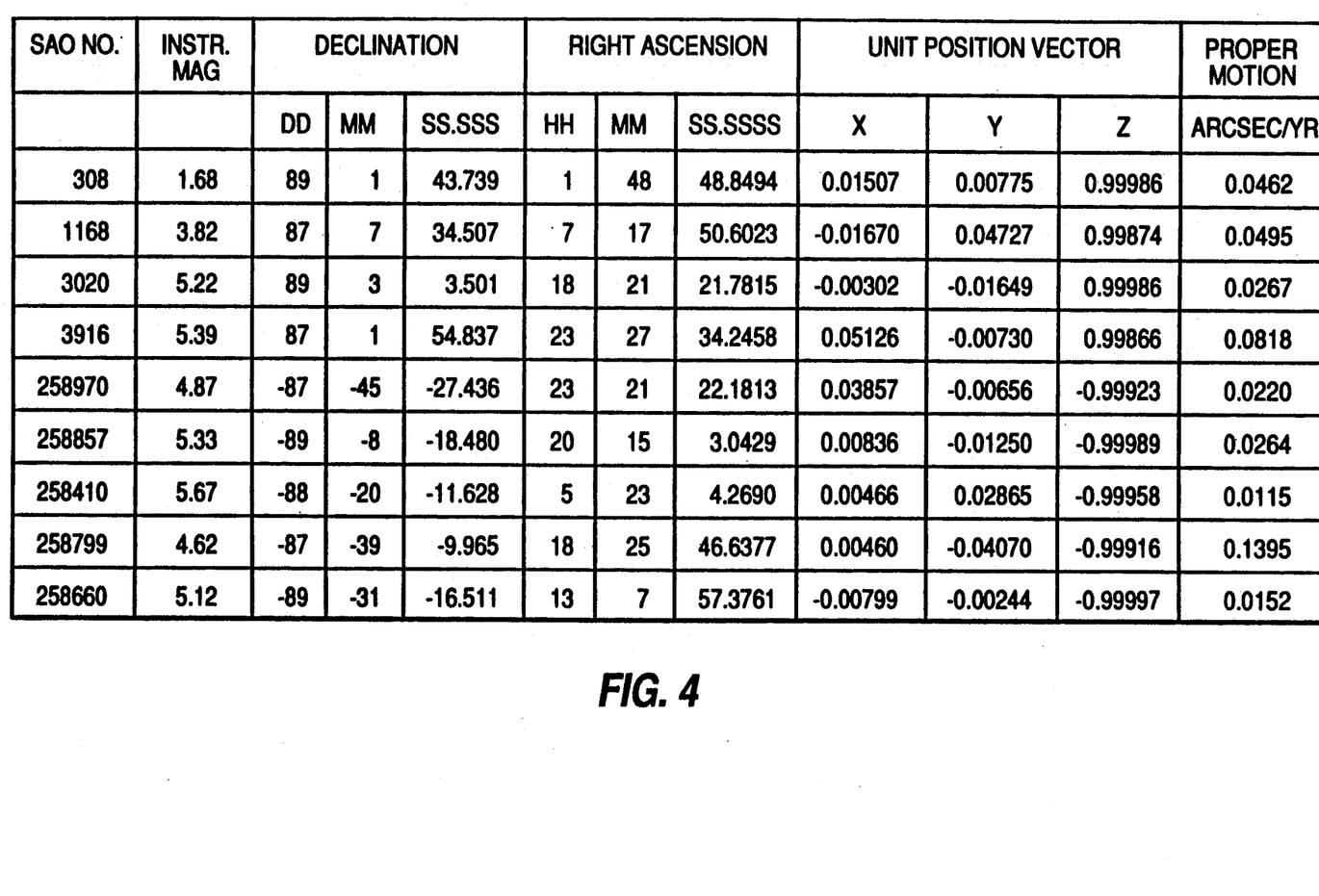
FIG. 4 tabulates the characteristics of some polar stars.

FIG. 4 tabulates the characteristics of various polar stars. The designation SAO stands for Smithsonian Astronomical Observatory. North polar stars in the table have numbers ranging from 308 to 3916, and south polar stars have numbers ranging from 258970 to 258660. As illustrated in FIG. 4, SAO number 308 (Polaris) has an instrument magnitude of 1.68, and is therefore brighter than instrument magnitude 3.0. Thus, a polar star sensor which is pointed in a polar direction and which, as described above, is capable of sensing only stars brighter than about instrument magnitude 3.0, will sense only SAO number 308. This greatly simplifies the star identification processing, and results in cost reduction. Polar stars other than SAO No. 308 could be used, as for example SAO Nos. 3020 or 258857. While cooling of the imager would not be necessary to use SAO No. 3020, discrimination of brightness between Nos. 308, 3020, and less bright stars would be required, which makes the discrimination more complex than when sensing only SAO No. 308. As for the choice between north and south polar stars, No. 258857 and No. 258660 have similar magnitudes and declinations, which might confuse the sensor. Thus, the optimum choice of polar star is SAO No. 308, although other stars could be used.

The yaw information calculated in block 544 of FIG. 5 and the pitch and roll information, is available to control block 28 of FIG. 1, which processes the information in conventional attitude control fashion for operating the torquers for maintaining 3-axis attitude.

Figure 7:
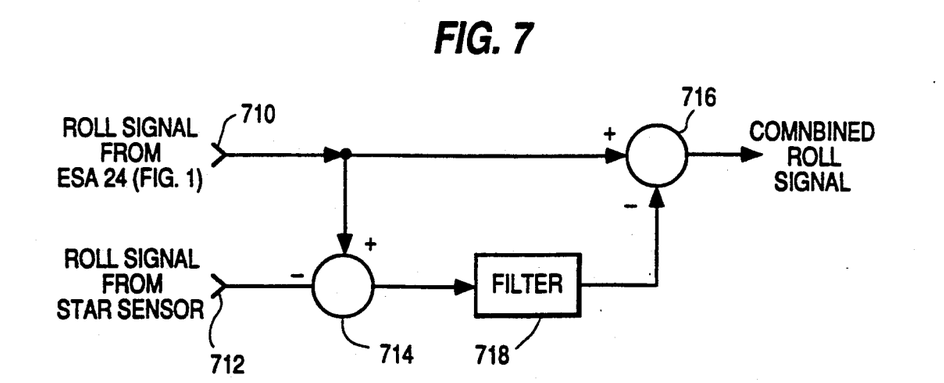
FIG. 7 is a simplified block diagram of an arrangement for combining roll signals from disparate sources.

As mentioned above in connection with FIG. 3, roll errors will cause the image of the polar star to deviate in the x direction. When the method of FIG. 5 has been used to determine yaw, with the pitch being known from ESA 24, the x displacement of the star image from the calculated location is representative of roll. Thus, a roll-representative signal is available by simple calculations based upon signals from star sensor 18. These roll signals may be used either alone or in conjunction with roll signals from an ESA. FIG. 7 illustrates in simplified block diagram form a combining arrangement for combining roll signals. In FIG. 7, roll signals from ESA 24 of FIG. 1 are applied by way of a data port 710 to the noninverting input ports of summing subsystems 714 and 716. The roll signal originating with star sensor 18 is applied to the inverting input port of summing subsystem 714. The difference output, including a large component of noise, is coupled from summing subsystems 714, through a filter 718, to the inverting input port of summing subsystem 716. The combined roll signal appears at the output of summing subsystem 716. The combined roll signal may have less noise than that of either sensor alone. If the noise characteristics of the sensors are the same, filter 718 is a simple averaging filter, having constant gain of 0.5 as a function of frequency. If the ESA roll signal noise were to be predominantly low frequency, and the noise of the star sensor roll signal principally high frequency, filter 718 would be a low-pass filter. For more complex noise characteristics, implementation of filter 718 as a Kalman filter might be more appropriate.

Other embodiments or avatars of the invention will be apparent to those skilled in the art. For example, while magnetic torquers have been described, thrusters or momentum or reaction wheels may be used for imparting torques to the spacecraft. Yaw rate can be derived by differencing the sensor output and using it to propagate yaw angle, without the need for a spacecraft ephemeris. The orbital yaw rate component, estimated using the Earth sensor roll output and the polar star sensor derived roll rate, can be used to correct the derived rate. The propagated yaw angle can be updated periodically using another yaw sensor, such as a sun sensor. Polar star sensor derived yaw and roll rates can also be used for control loop stabilization when accurate pointing in the presence of large disturbances is required, e.g., during thruster stationkeeping maneuvers. Alternatively, for precision pointing applications, yaw and roll can be propagated using rate integrating gyros and updated periodically using the polar star sensor yaw and roll measurements. These measurements can be used to estimate the gyro biases.

What is claimed is:

1. A 3-axis attitude control system for a spacecraft for operation in an equatorial orbit, comprising:
   polar star sensing means mounted on said spacecraft, with a boresight parallel to the pitch axis of said spacecraft, for producing star signals representative of the two-axis location of a selected polar star relative to said pitch axis;
   earth sensing means mounted on said spacecraft, for generating at least pitch signals representative of the pitch of said spacecraft about said pitch axis;
   a source of signals, for generating signals representing orbital location and ephemeris information;
   processing means coupled to said polar star sensing means, said Earth sensing means, and to said source, for processing said two-axis information and said pitch signals and for generating at least signals representative of roll and yaw information; and
   torquing means coupled to at least said processing means, for responding to said signals representative of said pitch, roll and yaw for torquing said spacecraft to maintain a desired attitude.

2. A system according to claim 1 wherein said Earth sensing means further comprises means for generating second signals representative of the roll of said spacecraft, said system including:
   combining means coupled at least to said Earth sensing means, for combining said roll-representative signals from said Earth sensing means with roll-representative signals originating from said polar star sensing means.

3. A 3-axis attitude control system for a spacecraft for an equatorial orbit, comprising:
   polar star sensing means mounted on said spacecraft, with a boresight parallel to the pitch axis of said spacecraft, for producing information signals representative of the two-axis location of a selected polar star relative to said pitch axis;
   earth sensing means mounted on said spacecraft, for generating pitch signals representative of the pitch of said spacecraft about said pitch axis, and for generating second signals representative of the roll of said spacecraft;
   a source of signals for generating signals representing orbital location and ephemeris information;
   processing means coupled to said polar star sensing means, to said Earth sensing means, and to said source, for processing said two-axis information and said pitch signals, and for generating at least signals representative of roll and yaw information;
   combining means, including
   (a) first summing means including inverting and noninverting input ports, and also including an output port, said inverting input port of said first summing means being coupled for receiving said roll signals originating from said star sensing means, and said noninverting input port of said first summing means being coupled to said Earth sensing means for receiving said roll signals therefrom, for producing at said output port a noise signal which includes noise components;
   (b) second summing means including an inverting input port and also including a noninverting input port coupled to said Earth sensing means for receiving said roll signal therefrom; and
   (c) filter means coupled to said output port of said first summing means and to said inverting input port of said second summing means for filtering said noise signal to produce a filtered noise signal, and for coupling said filtered noise signal to said second summing means, whereby said filtered noise signal is substrated in said second summing means to produce a combined roll signal; and
   torquing means coupled to at least said processing means for responding to said signals representative of said pitch, combined roll and yaw for torquing said spacecraft to maintain a desired attitude.

4. A spacecraft stabilized about at least a pitch axis, comprising:
a two-dimensional planar array of light sensors;
optical means adapted for focussing an object at a large distance onto a focal plane;
mounting means coupled to said array and to said optical means for locating said array at said focal plane with a central one of said light sensors of said array lying on a boresight, which boresight is parallel to said pitch axis; and
processing means coupled to said array and adapted for generating signals representative of deviation of only one polar star from said central one of said light sensors, said processing means generating said signals in the form of first and second signals, respectively, which represent components of said deviation in directions parallel to roll and yaw aces, respectively, of said spacecraft.

5. A spacecraft according to claim 4 further comprising threshold means coupled to said array for limiting sensitivity.

6. A spacecraft according to claim 5 wherein said threshold means limits at a magnitude corresponding to an instrument intensity near 2.5.

7. A method for controlling the attitude of a spacecraft in an equatorial orbit about the earth, comprising the steps of:
measuring at least spacecraft pitch using an earth sensing assembly to produce pitch signals representative of the pitch of said spacecraft about a pitch axis perpendicular to the orbital plane;
sensing the position of the image of a selected pole star projecting onto a light sensor array lying in a plane ideally orthogonal to said pitch axis, the sensing of said position being resolvable into components parallel to roll and yaw axes of said spacecraft, for generating star location signals;
generating signals representative of orbital location information and ephemeris information;
processing said pitch signals, said star location signals, and said signals representative of orbital location information and ephemeris information for generating yaw signals representative of spacecraft yaw about said yaw axis; and processing at least said yaw signals and said pitch signals for generating torque signals; and
operating torquing means under the control of said torque control signals for maintaining the 3-axis attitude of said spacecraft.

8. A method according to claim 7, further comprising the step of processing said pitch signals, said star location signals, and said signals representative of orbital location information and ephemeris information for generating signals representative of spacecraft roll about said roll axis.

9. A method according to claim 8, further comprising the step of processing said pitch, roll and yaw signals for generating torque control signals; and
operating torquing means under the control of said torque control signals for maintaining 3-axis attitude of said spacecraft.

* * * * *